March 11, 1947.  C. W. BERNARD  2,417,288
DUMP BEDBUCKET
Filed Dec. 4, 1944  3 Sheets-Sheet 1
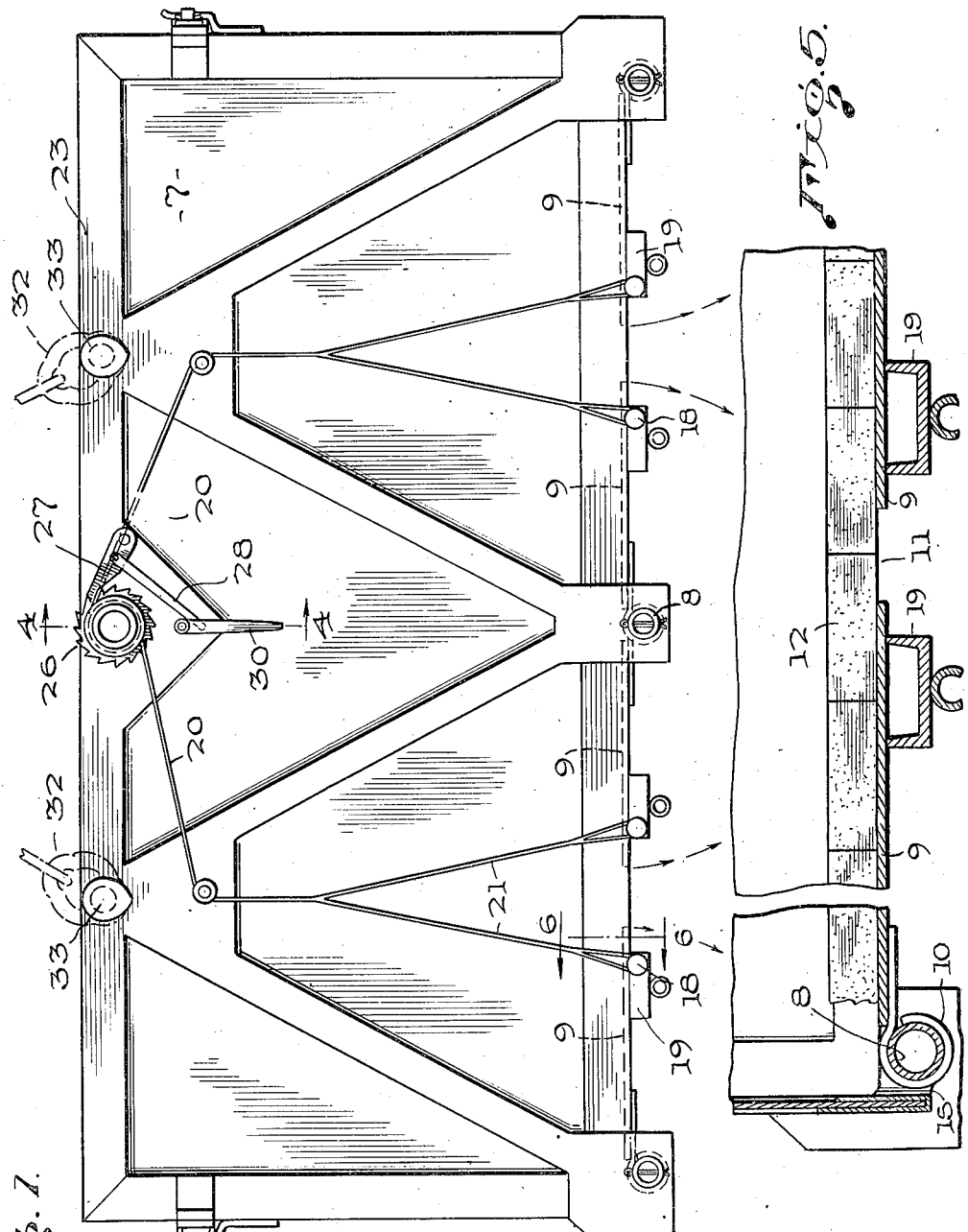
Inventor
CLYDE W. BERNARD

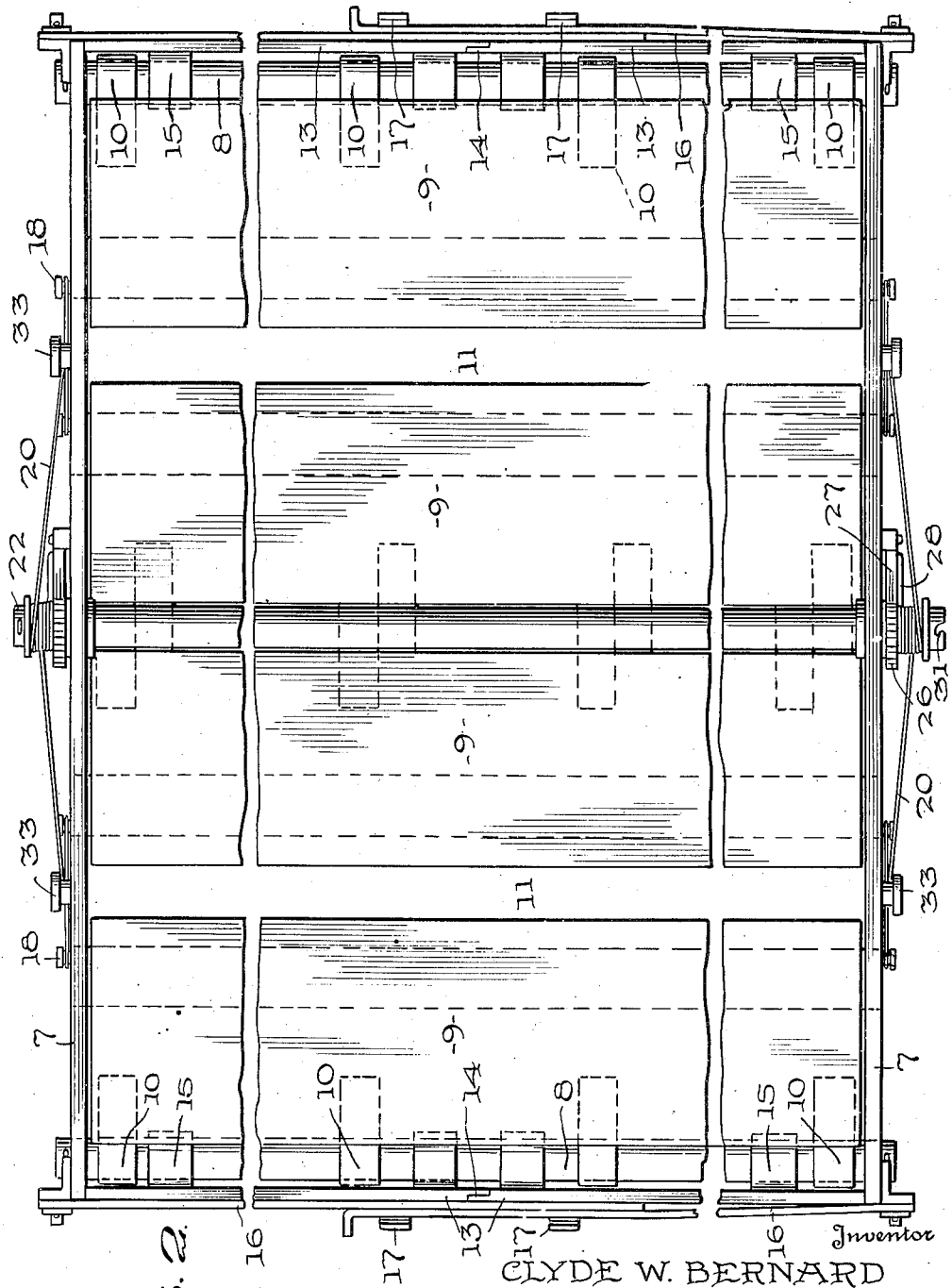

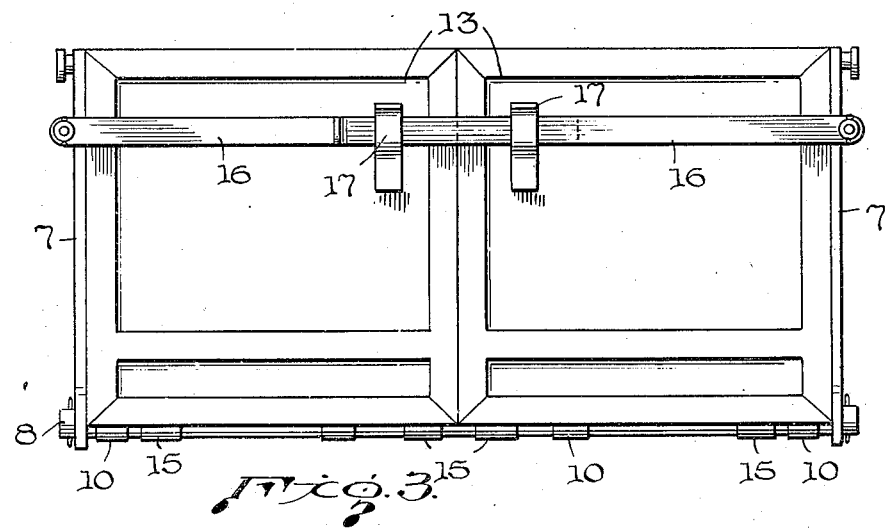
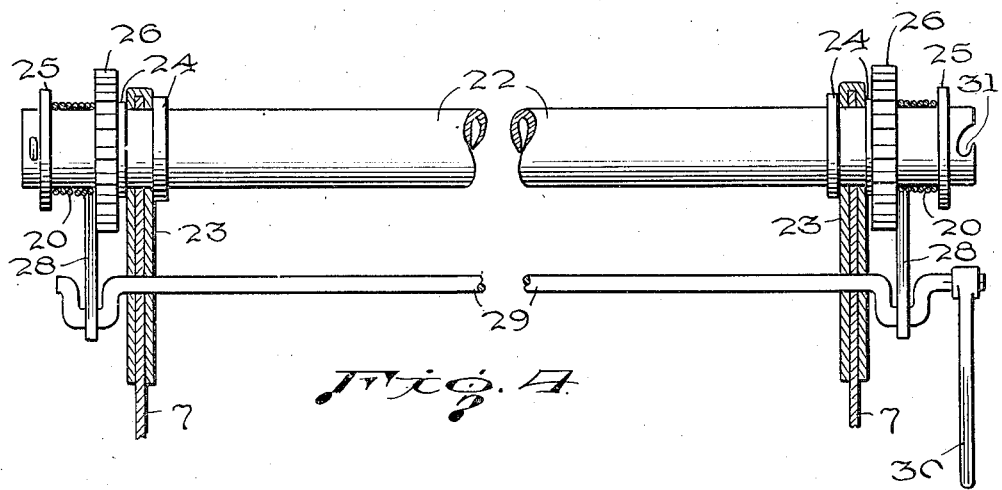
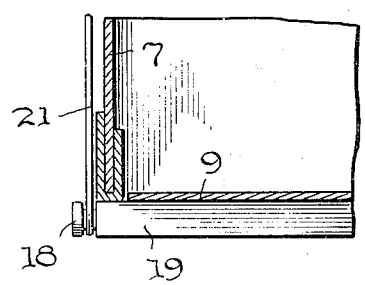

Patented Mar. 11, 1947

2,417,288

UNITED STATES PATENT OFFICE 2,417,288

DUMP BEDBUCKET

Clyde W. Bernard, Kingsport, Tenn.

Application December 4, 1944, Serial No. 566,465

3 Claims. (Cl. 294—71)

The invention comprises a dump bedbucket having for its object the provision of a carrier for loading and unloading clay, vitreous and other frangible products such as bricks, tiles, etc., with an absolute minimum of breakage, at the same time expediting both the loading and unloading operations without increasing the cost of these operations.

Other objects of the invention are to provide a bedbucket which is adapted for direct engagement with the loading floor during the loading operation and direct engagement with the unloading floor while the unloading operation is in progress; to provide a bedbucket with sides opening downwardly for use as ramps during the loading operation; to provide a bedbucket with a plurality of hinged doors opening downwardly to effect expeditious and orderly discharge of the bedbucket contents by elevation of the latter from the unloading floor with minimum breakage and chipping; to provide doors in the bottom of the bedbucket, the opposed margins of each pair of which are spaced to initiate discharge of the bucket contents immediately upon the uplift of the bucket; and to provide a bedbucket in which the several bottom doors are simultaneously and automatically opened by release of mechanical means and simultaneously closed by the same means.

A further object of the invention is to equip the bucket with suitable means to permit its engagement to truck carried or stationary hoist means of standard construction.

Other objects of the invention will be apparent from the following description of the preferred form of the invention, taken in connection with the accompanying drawings, wherein:

Figure 1 is a side elevational view of a dump bedbucket constructed in accordance with the present invention;

Figure 2 is a top plan view of the same;

Figure 3 is an end elevational view of the dump bedbucket showing the doors in a closed position;

Figure 4 is a detail fragmentary sectional view, taken on the line 4—4 of Figure 1, looking in the direction of the arrows;

Figure 5 is a detail enlarged fragmentary sectional view of the bottom of the dump bedbucket illustrating to advantage the manner of mounting the brick on the hinged doors constituting the loading floor of the bedbucket, and Figure 6 is a detail fragmentary sectional view taken on the line 6—6 of Figure 1, looking in the direction of the arrows.

The device of the present invention includes parallelly arranged sides 7 which may be suitably reinforced and are engaged at their terminals and at a point approximately midway their ends, by tubular shafts 8. These shafts also, as shown to advantage in Figures 1, 2 and 5, constitute axles upon which the loading floor of the dump bedbucket is hingedly mounted. The loading floor in the present instance consists of a plurality of doors 9, which carry hinge straps 10, the latter being convoluted on the shafts. Particular attention is directed to the fact that, as advantageously illustrated in Figures 1 and 2, the adjacent edges of the doors 9 are spaced, as indicated at 11, which spaces are spanned by bricks or tiles 12 when the latter are loaded in the bedbucket. By arranging the bricks so that they span the openings 11, after the bedbucket has been deposited on the ground for unloading, the bricks or tiles, upon release of the doors 9, will be unloaded in a minimum period of time and from a minimum altitude. It have found that by this arrangement, breakage and chipping is held to an absolute minimum, the amount of loss per load being negligible.

The bedbucket also includes twin ends, each of which consists of gates 13, the adjacent ends overlapping in a manner to provide a flush joint 14 when the gates are closed. Each of the gates is hingedly mounted to the bottom of the bedbucket, as indicated at 15. Means are employed for securing the end gates from casual opening. This consists of bars 16, each of the latter being hinged to one of the sides 7 of the bedbucket. The upper ends of the bars overlap and are adapted for engagement in upwardly opening loops 17, one loop being carried by each of the end gates. To permit the end gates to open and swing downwardly for use of the latter as ramps, the bars 16 are disengaged from the loops, in an obvious manner.

I provide unitary operating mechanism for the doors 9 which is engaged with pintles 18, one of the pintles extending from each end of a reinforced rib 19. A rib is engaged with the bottom face of each of the doors 9 and spaced from the free edge of the door, as illustrated to advantage in Figure 5. The operating mechanism includes a pair of cables 20 each of which has a bifurcated end 21. One of the furcations is engaged with a pintle on one of the doors, the other furcation engaging a similar pintle on an opposite door, as shown to advantage in Figure 1. The opposite ends of the cables 20 are engaged with a drum or shaft 22, which latter is rotatably mounted in the upper reinforced margins 23 of the sides 7 of the bedbucket. Longitudinal displacement of the drum is prevented by suitable annuli 24, while displacement of the cables 20 from the opposite ends of the drum is prevented by annuli 25. The drum 22 is equipped, near each end, with a ratchet wheel 26, the teeth of which are adapted to be engaged by a pawl 27. One end of the pawl is pivotally engaged with a reinforced portion of one of the sides 7 of the bedbucket. The pawls 27 are simultaneously operable through links 28 by a U shaft 29 and a handle 30. The shaft 29 is rotatably mounted in said reinforced margins 23 at the top of the sides 7, as illustrated to advantage in Figure 4. One end of the shaft is extended to provide a support for the handle 30. Assuming that the doors 9 are closed, as shown in Figure 1, a forward pull of the handle 30 disengages the pawls 27 and permits the doors 9 to swing downwardly. When it is desired to close the doors, the drum 22 is rotated and this may be done in any suitable manner and by any conventional means. For this purpose, I have provided crank receiving recesses 31 in one end of the drum, which may be engaged by a crank in an obvious manner and the drum rotated in order to wind the cables 20 on the ends of the drum into the position shown in Figure 4.

I have found after much experiment, that in unloading bricks and tiles and other frangible articles, breakage may be eliminated and chipping reduced to a negligible minimum, if the stacked bricks or tiles in the bedbucket are deposited on the ground from a minimum altitude and with minimum displacement. Many tests have shown that by spacing the adjacent edges of the doors in the bottom of the bedbucket, through which the contents are evacuated, the desideratum of the present invention is accomplished. The interior dimensions of the bedbucket are preferably such that when the standard length bricks are loaded in the bedbucket, the bricks will span the interstice between the adjacent margins of the door. Consequently, only a very slight movement of the doors supporting the bricks, is necessary to deposit the bricks on the ground or other unloading surface, after the bedbucket itself has been lowered, to said surface. Gradual elevation of the bedbucket effects mass evacuation of the bricks from the bedbucket with a minimum displacement of the bricks. For elevating the bedbucket of the present invention, I employ any standard type of hoist, such as cranes commonly used on trucks and the like. Parts of the hoist means, indicated at 32, shown in Figure 1, are detachably engageable with headed stub shafts 33 which extend laterally from said upper reinforced margins 23 of the sides 7. After the bedbucket has been elevated to a point where the open doors 9 clear the tops of the unloaded bricks or other material, the doors may be closed in an obvious manner.

I have also found it to be of considerable convenience to provide a bedbucket supplying its own ramps, thereby materially expediting the loading operation. With the present invention, when the bedbucket is on a loading surface with the doors 9 closed, the end gates 13 may, after the bars 16 have been disengaged, be swung down until the free ends engage the loading surface. The bedbucket may then be loaded by wheeling the loading material, in a wheelbarrow or the like, up the ramps, now formed by the open end gates 13, and into the bedbucket in an obvious manner. Here the bricks or tiles are stacked, preferably lengthwise, as shown in Figure 1. After the bedbucket has been loaded, the gates are closed in an obvious manner and the bars latched. While the contents of the bedbucket is being dispensed, it is of course necessary to the effective operation of this invention, that the doors be retained in a closed position, as advantageously illustrated in Figure 2.

While I have herein described a preferred form of my invention, I am of course aware that various changes may be made therein, within the scope of the claims hereto appended.

What I claim is:

1. A dump bedbucket including a bucket body with a multi-part bottom, said parts being movable, the adjacent edges of the parts being spaced to expose substantial areas of the articles spanning the spaces.

2. A dump bedbucket including a bucket body, hinged doors constituting the bottom of the bucket, the adjacent edges of the doors being separated to support only marginal portions of articles spanning the interstices between said edges of the doors, and means mounted on said body and engaged with the doors to effect simultaneous release of the latter.

3. A dump bedbucket including a bucket body, hinged doors constituting the bottom of the bucket, the adjacent edges of the doors being separated to support only marginal portions of articles spanning the interstices between said edges of the doors, and means mounted on said body and engaged with the doors to effect simultaneous release of the latter, parts of said means being operable to effect simultaneous closing and automatic locking of the doors.

CLYDE W. BERNARD.

REFERENCES CITED

The following references are of record in the file of this patent:

UNITED STATES PATENTS

| Number | Name | Date |
|---|---|---|
| 683,828 | Winans | Oct. 1, 1901 |
| 882,384 | Hansen | Mar. 17, 1908 |
| 1,218,920 | Averill | Mar. 13, 1917 |
| 1,320,350 | Summers | Oct. 28, 1919 |
| 1,425,383 | Insley et al. | Aug. 8, 1922 |
| 2,239,671 | Dempster | Apr. 29, 1941 |